C. MACMILLAN.
ELECTRIC SHIP PROPULSION.
APPLICATION FILED MAR. 15, 1916.
1,313,102.
Patented Aug. 12, 1919.
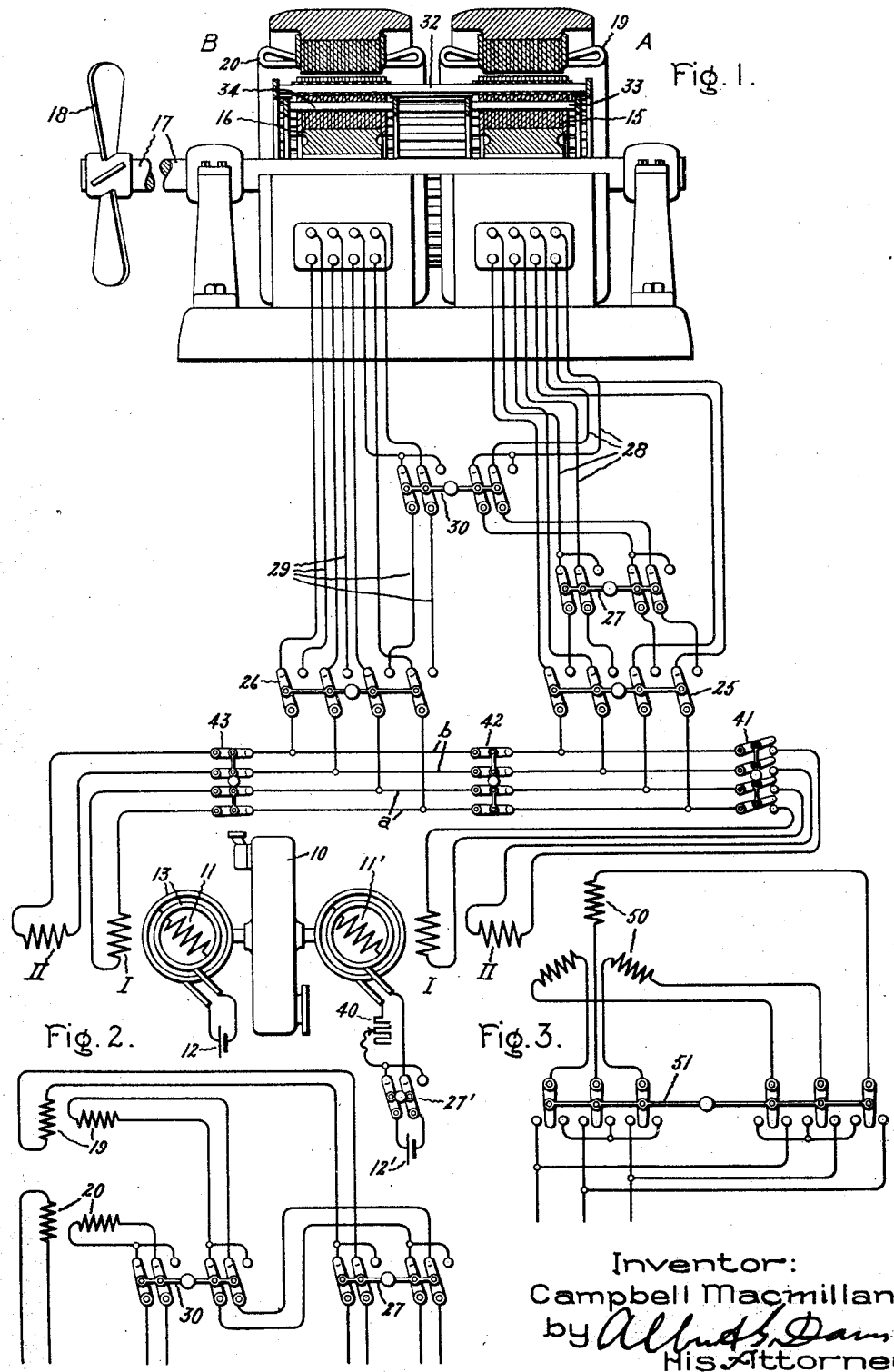
Inventor:
Campbell Macmillan,
by Alfred S. Davis
His Attorney.

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

ELECTRIC SHIP PROPULSION.

1,313,102.   Specification of Letters Patent.   Patented Aug. 12, 1919.

Application filed March 15, 1916. Serial No. 84,470.

*To all whom it may concern:*

Be it known that I, CAMPBELL MACMILLAN, a subject of the King of Great Britain, residing at Schenectady, county of Schenectady, State of New York, have invented certain new and useful Improvements in Electric Ship Propulsion, of which the following is a specification.

My invention relates to electric ship propulsion employing electric motors of the induction motor type for driving the ship's propellers. The object of the invention is to provide an improved arrangement employing an electric motor of the induction motor type having high starting torque. More particularly the object of the invention is to provide an electric motor of the induction motor type particularly adapted for driving the propellers of a ship. Other objects of the invention will be brought out in the course of the following description:

The starting torque of a standard polyphase induction motor is relatively low and entirely inadequate for many purposes, such, for example, as the driving of the propellers of a large ship. Where induction motors have heretofore been employed or suggested for use as propeller-driving motors, it has been necessary to provide some means of obtaining increased torque at starting, or more particularly at relatively high slips, of the motors. This increased torque has for example been obtained by inserting resistance in the secondary circuits of the motors, by giving the secondary windings an inductively changing effective resistance, by pole-changing, and so on. The aim of my present invention is to provide an improved induction motor of the squirrel-cage type having high starting torque, and in addition to provide an improved apparatus including a motor of this general type for driving the propellers of a ship.

In its broad aspect the improved motor of my present invention comprises primary and secondary windings with the primary windings so related to each other that all the motor elements may act in conjunction and further so that by modifying the relative electrical relations of the primary windings one secondary winding can be partially or completely cut out of operation or can in effect be connected in series relation with another secondary winding whereby the effective resistance of the secondary windings may be increased without altering their electrical connections. The invention will be better understood by consideration of a definite apparatus, and for this purpose I will briefly explain my invention by reference to a motor which I now deem to represent the preferred form of the invention. In many electrical power installations, such, for example, as a large marine propulsion equipment, the driving motor may be arranged in two units on the same shaft with two bearings. In the preferred form of my invention I take advantage of this fact, and provide in effect two independent induction motor units having primary and secondary magnetic cores. The primary magnetic core of each motor unit carries a primary winding of the ordinary type. A set of secondary conductors of the squirrel-cage type is carried through slots in both secondary cores, without any end ring between the cores but with coöperating end rings on their outer ends. In addition each rotor carries a complete and independent squirrel-cage winding in the same slots, with the conductors thereof either above, below or alongside the continuous or long conductors. The short conductors and long conductors may be of similar or different materials and cross sections, according to the conditions to be met. The virtual or effective resistance of the secondary circuits of the motor units may then be raised by cutting the common squirrel-cage winding wholly or partially out of operation. This result is accomplished by reversing the direction of the currents supplied to the primary winding of one of the motor units, that is to say, by changing its phase angle with respect to the other primary winding through 180 electrical degrees, so that the electromotive forces in the two halves of the long secondary conductors oppose each other. When the primary windings of the two motor units are supplied from two generators, this effect can obviously be obtained by reversing the field current of one generator, and then by altering the relative values of the field currents of the two generators, the opposition of the electromotive forces in the long secondary conductors may be rendered either partial or complete. In case it is not necessary to have the maximum torque of both motor units available during starting, as for example in marine propulsion, the primary windings of one motor may be opened, whereby the secondary winding of this motor unit acts as a short-circuited transformer, with the independent squirrel-cage winding as the short-circuited secondary, thus providing a circuit of increased resistance for the secondary current of the other motor unit.

The novel features which I believe to be patentably characteristic of my invention are definitely indicated in the claims appended hereto. The principle of the invention and its practical application and mode of operation will be fully understood from the foregoing brief explanation taken in connection with the following description and accompanying drawings, in which:

Figure 1 diagrammatically illustrates what I now consider the preferred form of the motor of my present invention embodied in a system of electric ship propulsion; Fig. 2 is an explanatory diagram of the electrical connections for reversing the relative current directions in the primary windings of the two motor units of Fig. 1; and Fig. 3 is an explanatory diagram of one way of reversing the currents in a three-phase primary winding.

Referring to Fig. 1, there is diagrammatically represented an elastic-fluid turbine 10 mechanically coupled to a polyphase alternator. I have shown for the purpose of illustration an alternator of the revolving field type having an exciting winding 11 supplied with direct current from any suitable source 12 by means of slip rings 13 and coöperating brushes. The alternator carries on its stator a quarter phase armature winding of which the phases I and II are connected to bus bars $a$ and $b$, respectively.

Two induction motor units A and B have their secondary cores 15 and 16 direct-connected to a propeller shaft 17 carrying at its end a propeller 18. The stator or primary windings 19 and 20 of the motors A and B, respectively, are wound for the same number of poles and are so connected that their corresponding poles have relatively the same angular positions in space. The primary windings 19 and 20 are quarter phase windings designed for pole-changing, and are, accordingly, adapted to be connected to the bus bars $a$ and $b$ by means of pole-changing switches 25 and 26, respectively. Any of the well-known means for producing primary magnetic poles of different pole numbers may be employed to produce the different polar arrangements of the primary windings of the motors A and B, and since there are numerous arrangements for accomplishing this result I do not deem it necessary to specifically explain any particular means, but by way of example I will mention the patent to Ernst F. W. Alexanderson, No. 841,609, dated January 15, 1907, as illustrating one way in which the primary windings 19 and 20 may be arranged to produce primary magnetic poles of different pole numbers.

A switch 27 is provided for displacing the primary magnetic poles of the motor unit A 180 electrical degrees from the corresponding poles of the motor unit B. The pole-displacing switch 27 is included in leads 28 which when connected to the bus bars $a$ and $b$ through the pole-changing switch 25 establish the low speed pole number of the motor unit A. The pole-changing switch 26 when connected to leads 29 establishes the corresponding low speed pole number of the motor unit B. A reversing switch 30 is included in phase I, connected to bus bars $a$, of the leads 28 and 29.

The electrical connections of the primary windings 19 and 20 of the motor units A and B, respectively, to the pole-displacing switch 27 and the reversing switch 30 will be clearly understood from the diagram of Fig. 2. The reversing switch 30 reverses the relative direction of current flow in one phase of both primary windings 19 and 20, and thus reverses the phase rotation of the primary magnetic fields of both motor units A and B. The pole-displacing switch 27 reverses the relative direction of current flow in both phases of the primary winding 19, so that the primary magnetic poles of the motor unit A are shifted 180 electrical degrees with respect to the corresponding primary magnetic poles of the motor unit B. In Fig. 3 I have diagrammatically illustrated how the direction of current flow in a three-phase primary winding 50 may be reversed by a switch 51.

The secondary cores 15 and 16 of the motor units A and B carry a common squirrel-cage winding 32 and independent squirrel-cage windings 33 and 34. The conductor bars of the squirrel-cage winding 32 extend through slots in both the cores 15 and 16. The conductor bars of the squirrel-cage windings 33 and 34 are positioned in the bottom of the same slots in which the long conductor bars are arranged, but it will be obvious that other arrangements of the long and short conductor bars may be made.

The operation of the apparatus of Fig. 1 thus far described is as follows: When the pole-changing switches 25 and 26 occupy the positions represented in Fig. 1 the primary windings of the motor units A and B are arranged for their high speed pole numbers, and since the poles of both primary windings have the same angular positions in space the electromotive forces in the conductor bars of the squirrel-cage winding 32 will act in conjunction, and, accordingly, this winding provides a low resistance cirary windings 33 and 34 can be varied until the most economic design is obtained.

The most severe duty which the propelling apparatus of a ship is called upon to perform is the reversing or even the stopping of the ship after full speed ahead. By the improved arrangement of my present invention this duty can be efficiently and effectively performed, and a sufficiently large motor torque can be obtained for any ordinary emergency of navigation. The starting of a ship does not require such a high torque as reversing because the propellers are easily set in motion in still water by the propeller-driving motors and the ship gradually and easily acquires speed. Where it is not necessary to have the maximum torque of both motor units available, as for example, in starting the ship from rest, the primary winding of the motor unit A can be disconnected from the source of energy supply, as for example by throwing the pole-changing switch 25 to its central or "off" position, or by opening the switches 41 and 42.

With the primary winding 20 thus connected to the live bus bars $a$ and $b$ and the primary winding 19 disconnected therefrom the electromotive forces generated in the long conductor bars of the secondary winding 32 will cause currents to circulate therethrough. In the slots of the rotor core 15 these long bars are lying side by side with bars of the independent squirrel-cage winding 33 which consequently acts as the short-circuited secondary winding of a transformer and consequently carries a current equal in value to its transformer primary current. In such a 1:1 ratio transformer, resistance in the secondary is exactly equivalent to resistance in the primary. Let $R_1$ and $R_2$ represent the relative resistances of the two squirrel-cage windings in one rotor, where $R_1$ refers to the winding 32 and $R_2$ to the independent windings 33 and 34. Then the total resistance of the winding 32 in both motor units is $2R_1$. By the 1:1 ratio transformer action in the rotor core 15, the independent squirrel-cage winding 33 is virtually connected in series with the winding 32. Therefore, the total virtual resistance of the winding 32 relatively to the active motor unit B is $2R_1 + R_2$.

The total resistance of the active motor when both secondary windings are of similar construction is due to the two windings in parallel. The total resistance of the active motor B is therefore $$\frac{1}{\frac{1}{R_2} + \frac{1}{2R_1 + R_2}} = \frac{R_2 R_1 + \frac{R_2^2}{2}}{R_1 + R_2}$$

The resistance of the secondary circuit of each motor unit when both are excited and operating normally is $$\frac{R_1 R_2}{R_1 + R_2}$$

Therefore, the ratio of the starting resistance with the primary winding of one motor unit disconnected from the supply to the normal operating resistance is $$\frac{\frac{R_2 R_1 + \frac{R_2^2}{2}}{R_1 + R_2}}{\frac{R_1 R_2}{R_1 + R_2}} = 1 + \frac{1}{2}\frac{R_2}{R_1}$$

or denoting the ratio of the resistance of the high resistance winding to that of the low resistance winding $\frac{R_2}{R_1}$ by $n$, the ratio of starting and running resistances is $$1 + \frac{n}{2}$$

The peculiar conditions in ship propulsion, where the limiting feature is the regulation of the alternating current generator, make it permissible to deliver all the starting and reversing power for one propeller shaft to one motor, even if there are two or more motors on the shaft. Thus if one generator supplies two motors of suitable design during the normal full speed operation, the generator will not be capable of delivering much over twice normal current at starting, while either motor may without objection take four times normal current while starting or reversing. It will thus be evident that the primary winding of motor unit A may be disconnected from the generator and the motor unit B will be able to take all the current which the generator is capable of delivering, and at the same time the thermal capacity of both rotor cores for storing and dissipating heat will be utilized.

The magnetizing current for the transformer formed by the secondary windings of the disconnected motor unit A will be drawn from the generator as an additional wattless current, but at the reduced voltage required for starting the sum of the two magnetizing currents relatively to the energy currents at starting will not be at all excessive. Where desired the power factor can be improved by maintaining the second generator electrically connected to the stator winding 19 of the motor unit A with a very small field excitation. The switch 42 will then be open and the switch 41 closed. It will of course be understood that the second generator is in effect running substantially light with a reduced field excitation of the proper value.

The operation of the apparatus with the primary winding of one motor unit unexcuit for the secondary currents of both motor units. This condition corresponds to the full speed operation of the ship, and lower or cruising speeds can be obtained by throwing both pole-changing switches 25 and 26 to their right-hand positions, as viewed in Fig. 1, which establishes the low speed polar arrangements of the primary windings 19 and 20. If the pole-displacing switch 27 is moved to its right-hand position, Figs. 1 and 2, when the pole-changing switches 25 and 26 occupy their right-hand positions, the primary magnetic poles of the motor unit A become relatively displaced 180 electrical degrees from the primary magnetic poles of the motor unit B, and, accordingly, the electromotive forces in the conductor bars of the squirrel-cage winding 32 no longer act in conjunction but are in opposition, so that no current flows therein, and the common squirrel-cage winding is thus effectively cut out of operation. The total secondary current of the motor unit A must, therefore, flow in the squirrel-cage winding 33 and the total secondary current of the motor unit B must flow in the squirrel-cage winding 34. By proper design of the squirrel-cage windings 33 and 34 any desired secondary circuit resistance for this condition of operation can be obtained.

In Fig. 1, I have diagrammatically illustrated a second quarter phase alternator direct-connected to the turbine 10. The field winding 11' of this alternator is supplied with direct current from any suitable source 12'. A reversing switch 27' and an adjustable resistance 40 are included in the circuit of the field winding 11'. The quarter phase stator winding of the alternator is adapted to be connected to the bus bars $a$ and $b$ by means of a suitable switch 41. Two other switches 42 and 43 are also associated with the bus bars $a$ and $b$. Under the conditions of operation which I have just described the switches 42 and 43 are closed and the switch 41 is open, so that the second alternator delivers no energy to the propeller-driving motors and could in fact be eliminated from the equipment. On the other hand, all three switches 41, 42 and 43 may be closed and the two generators operated in parallel. In certain equipments, however, it may be desirable to feed each motor unit from a separate generator, in which case the switches 41 and 43 are closed and the switch 42 is open. With such an arrangement the relative direction of current flow in the primary winding 19 of the motor unit A can be reversed by means of the pole-displacing switch 27, just as previously described. In addition, however, the same result can be accomplished without manipulating the switch 27 and this switch could even be omitted. Reversing the direction of current flow in the circuit of the field winding 11' will reverse the relative direction of current flow in both phases of the primary winding 19, and hence operation of the reversing switch 27' will displace the primary magnetic poles of the motor unit A 180 electrical degrees with respect to corresponding poles of the motor unit B, thereby rendering the squirrel-cage winding 32 ineffective. Furthermore, by varying the magnitude of the current flowing in the circuit of the field winding 11' the relative magnitudes of the opposing electromotive forces in the conductor bars of the winding 32 can be varied, so that this winding will carry some or no current depending upon whether the opposition of the electromotive forces is partial or complete.

It will be observed that when the direction of current flow in the primary winding 19 is controlled by the generator field switch 27' the secondary winding 32 can be rendered inoperative for either polar arrangement of the primary windings. Of course this result can also be obtained by providing a second pole-displacing switch, like the switch 27, for the high speed pole number of the primary winding 19. In marine equipments it will generally only be necessary to provide the low speed pole connections with a pole-displacing switch, since the increased motor torque will only be required for this polar arrangement. Suitable variations in the speed of the motors and propellers can be obtained with either the low or high pole numbers of the motors by controlling the admission of elastic fluid to the turbine. The desired range of speeds for both the high and cruising speed arrangements is, accordingly, obtained by such control of the admission of elastic fluid to the turbine.

The long conductor bars of the winding 32 are of low resistance and are insulated from the cores 15 and 16 so as to prevent the flow of shunt currents through the laminations of the cores when the two halves of these bars are in electrical opposition. This insulation need only be sufficient to withstand the low voltage generated in each bar. The conductor bars of the windings 33 and 34 are, on the other hand, of greater resistance than those of the winding 32 and are preferably driven into the slots in their respective cores without insulation so as to give the most favorable thermal and mechanical conditions for carrying away the heat generated in these bars. Where desired a small amount, for example, one inch, may be added to the depth of the standard rotor core so that a greater amount of material is available for heat storage and dissipation during starting and stopping of the motors. If such an increase in the dimensions of the rotor cores is objectionable, the dimensions and resistivity of the materials of the conductor bars of the high resistance secondcited is particularly favorable for the conditions encountered when relatively large amounts of heat are generated. Both rotor cores are in this case available for the storage and dissipation of heat. The transformer action between the secondary windings of the unexcited motor unit is highly efficient, because corresponding and opposing conductors are located in the same slots and the slot reactance is almost entirely canceled, so that the resulting magnetomotive force is very small, being in fact for any particular slot proportional to the current in the long conductor minus the current in the short conductor. On the other hand, the magnetomotive force for any slot with normal motor operation is the sum of the currents flowing in the two conductor bars therein. By such efficient transformer action between the secondary conductors of the unexcited motor unit a considerable amount of electrical energy is transferred to the high resistance secondary winding of the unexcited motor unit, where the thermal and mechanical conditions are most favorable for the storage and dissipation of the heat into which this energy is converted. The effective resistance of the secondary winding is thus increased and its power of energy dissipation is also increased without varying its electrical connections.

It will be understood from the foregoing that the maximum torque of the motor is obtained when the secondary winding 32 is entirely inoperative, that is to say, when the opposition of the electromotive forces in the conductors of this winding is complete. This condition is obtained by reversing the relative direction of current flow in the primary winding of motor unit A, whereby the primary magnetic poles of this motor unit are displaced substantially 180 electrical degrees with respect to corresponding poles of motor unit B. With the apparatus in this condition the primary current of the motor unit A can be decreased, for example, by decreasing the excitation of its supply generator, where both motor units are connected to independent generators. When the excitation of the supply generator of motor unit A has been decreased to zero the primary winding of this motor unit will receive no energy, and will in effect be disconnected from the source of energy supply, and an intermediate motor torque will be obtained as previously explained. Normal running conditions can then be attained by increasing in the reverse direction the excitation of the supply generator of motor unit A until both motor units receive their relative proper amounts of electric energy. It will, accordingly, be seen that I obtain different motor torques by modifying the electrical relations of the primary windings of motor units A and B without changing the electrical connections of the secondary windings. I do not herein claim the relative reversal or other change of the excitations of two generators for modifying the electrical relations of the primary windings of two motor units, where both motor units are supplied with electric energy from independent generators, since this forms the subject matter of an application for Letters Patent filed on behalf of Henry M. Hobart, Serial No. 85,717, filed March 21, 1916.

I have herein shown and particularly described certain embodiments of my invention for the purpose of explaining its principle and showing its application, but numerous modifications of the details of construction and arrangement of these embodiments and other applications will present themselves to those skilled in the art. I, therefore, wish to cover by the following claims all modifications within the spirit of the invention.

What I claim as new and desire to secure by Letters Patent of the United States is:—

1. A propelling apparatus for vessels comprising in combination a propeller shaft, two induction motor units having their rotors mounted on said shaft, an independent short-circuited secondary winding of relatively high resistance for each motor unit, a third secondary winding of relatively low resistance common to both motor units, the electrical relations of said motor units being such that the electromotive forces induced in the common conductors of said third secondary winding by said two motor units act substantially in conjunction when the primary magnetic poles of the two motor units have substantially the same angular positions in space but act more or less in opposition when the angular space relation of the primary magnetic poles of the two motor units is relatively displaced, two generators electrically connected to independently deliver electric energy to said two motor units, and means for reversing the excitation of one of said generators whereby the angular space relation of the primary magnetic poles of the motor unit electrically connected thereto are displaced with respect to the primary magnetic poles of the other motor unit.

2. A propelling apparatus for vessels comprising in combination a propeller shaft, two induction motor units having their rotors mounted on said shaft, an independent squirrel cage secondary winding of relatively high resistance for each motor unit, a third squirrel cage winding having conductors common to both of said motor units and providing a low resistance circuit for the secondary currents when the primary poles of the two motor units have substantially the same angular positions in space, two generators adapted to independently deliver electric energy to said two motor units, and means for varying and reversing the exciting current of one of said generators whereby the angular space relation of the primary magnetic poles of the motor unit electrically connected thereto are displaced with respect to the primary magnetic poles of the other motor unit.

In witness whereof, I have hereunto set my hand this 14th day of March, 1916.

CAMPBELL MACMILLAN.